United States Patent [19]

Lea et al.

[11] 4,397,689

[45] Aug. 9, 1983

[54] PROCESS FOR THE EXTRACTION OF PRECIOUS METALS FROM CONCENTRATES THEREOF

[75] Inventors: Richard K. Lea, Watford; Julian D. Edwards, Chalfont St. Peter, both of England; D. Frederick Colton, Burlington, Canada

[73] Assignee: Inco Limited, London, England

[21] Appl. No.: 298,356

[22] Filed: Sep. 1, 1981

[30] Foreign Application Priority Data

Sep. 5, 1980 [GB] United Kingdom ............... 8028662

[51] Int. Cl.³ .................. C22B 3/00; C01G 55/00; C01G 5/00; C01G 7/00
[52] U.S. Cl. .................................. 75/108; 423/22; 423/27; 423/40; 75/118 R; 75/121
[58] Field of Search .............. 423/22, 27, 40; 75/108, 75/118 R

[56] References Cited

U.S. PATENT DOCUMENTS

| | | | |
|---|---|---|---|
| 2,049,488 | 8/1936 | Braun | 23/19 |
| 2,945,757 | 7/1960 | Hoekstra | 75/121 |
| 3,238,038 | 3/1966 | Hunter | 75/7 |
| 3,920,789 | 11/1975 | Pittie et al. | 423/22 |
| 3,922,330 | 11/1975 | Pittie et al. | 423/22 |
| 3,979,207 | 9/1976 | MacGregor | 75/121 |
| 4,188,362 | 2/1980 | Edwards et al. | 423/22 |

FOREIGN PATENT DOCUMENTS

| | | |
|---|---|---|
| 2457672 | 6/1975 | Fed. Rep. of Germany . |
| 2459099 | 6/1975 | Fed. Rep. of Germany . |
| 2306273 | 11/1975 | France . |
| 260451 | 11/1926 | United Kingdom . |
| 1090294 | 9/1964 | United Kingdom . |
| 1481385 | 7/1977 | United Kingdom . |
| 1490815 | 11/1977 | United Kingdom . |
| 1517270 | 7/1978 | United Kingdom ............ 423/22 |
| 1527758 | 10/1978 | United Kingdom . |
| 2013644 | 8/1979 | United Kingdom . |
| 2065092 | 6/1981 | United Kingdom . |

OTHER PUBLICATIONS

Paper Lonrho Process, L. Floyd, May 1978.
Solvent Extraction in Platinum Group Metal Processing, M. J. Cleare, P. Charles & D. J. Bryson, J. Chem. Tech., Biotechnol, 1979, pp. 210 to 224.
Refining of Gold from Precious Metal Concentrates by Liquid-Liquid Extraction B. F. Rimmer, Chemistry & Industry, Jan. 19, 1974, pp. 63 to 66.
Countercurrent Extraction Separation of Some Platinum Group Metals, Part II E. W. Berg & E. Y. Lau, Analytica Chimica Acta, 27, 1962, pp. 248 to 252.
The Platinum Group Metals: Part 1, R. J. Dosing, May 1980, pp. 41 to 48, (Unique Properties are Irreplaceable in Modern Industry.
The Platinum Group Metals: Part 2 How Industry Refines and Uses the Heavy Metals, R. J. Dosing, Jul. 1980, pp. 32 to 42.
Transcript of talk given by R. I. Edwards of NIM at the AIME Conference held in New York, May 1978.

*Primary Examiner*—Herbert T. Carter
*Attorney, Agent, or Firm*—Edward A. Steen; Francis J. Mulligan,Jr.; Raymond J. Kenny

[57] ABSTRACT

The process comprises the steps of leaching the concentrate with hot hydrochloric acid and chlorine gas to dissolve most of the gold, platinum and palladium, treating the residue from the leaching step with an excess of an alkaline oxidizing agent to solubilize the ruthenium, slurrying the resulting solids in water, combining the precious metal values from the slurry with the liquor from the leaching step and releaching the resulting slurry with hot hydrochloric acid and chlorine. The leach liquor which is then separated from the remaining solids is a chloride solution which contains substantially all the platinum group metals and gold present in the concentrate.

6 Claims, No Drawings

PROCESS FOR THE EXTRACTION OF PRECIOUS METALS FROM CONCENTRATES THEREOF

This invention relates to the extraction of precious metals, that is to say metals of the platinum group, gold and silver, from concentrates containing them. It is particularly applicable, but not limited, to the treatment of precious metal concentrates formed in the refining of nickel-copper ore, for example anode slimes from the electro-refining of copper or residues from the pressure carbonyl extraction of nickel. Such concentrates commonly contain gold, silver and all six of the platinum metals, namely platinum, palladium, rhodium, ruthenium, iridium, and osmium in varying quantities, together with base metals and other impurities, commonly copper, nickel, iron, selenium, tellurium, arsenic, antimony, tin, lead, bismuth and silica.

It is notoriously difficult to dissolve the precious metals values present in precious metal concentrates, and hitherto it has been the practice in refining such concentrates to effect an initial separation by leaching with aqua regia or hydrochloric acid and chlorine gas, to dissolve most of the gold, platinum and palladium, leaving a residue containing most of the silver and other platinum metals. In practice this division is far from complete, and this greatly complicates the subsequent separation, recovery and purification of the individual metals. Also, if aqua regia is used, noxious brown fumes are given off during the reaction and, as these fumes are environmentally unacceptable, they have to be treated before being discharged from the plant which makes the process more complicated to operate and less economically attractive.

Whichever leaching agent is used, the end result is the same: a solution containing most of the gold, platinum and palladium and a solid residue containing most of the silver and other precious metals together with some residual gold, platinum and palladium. The dissolved metal values may be recovered by precipitation or solvent extraction while precious metal values from the solid residue are extracted by selective leaching reactions after smelting with lead.

It will be appreciated that these processes are long and complex and therefore that a considerable amount of precious metals will be tied up in intermediates at any one time. For these reasons, there has recently been considerable interest in developing a shorter and more efficient process and one area in which research has been successful is in the solvent extraction of dissolved metal values from solution.

The present invention is based on the discovery that it is possible to treat a precious metal concentrate in such a way that substantially all the platinum group metals and gold are separated from the silver and brought into a single chloride solution.

This invention therefore provides a process for leaching a concentrate containing precious metals, comprising the steps of leaching the concentrate with hot hydrochloric acid and chlorine to dissolve most of the gold, platinum and palladium present leaving a solid residue containing substantially all the other precious metals, separating the residue and heating it with an excess (on a weight for weight basis) of an alkaline oxidising agent to solubilise the ruthenium, slurrying the resulting solids in water, combining the precious metal values from the slurry with the liquid from the leaching step, releaching the resulting slurry with hot hydrochloric acid and chlorine, and separating the leach liquor from the remaining solids.

In this way, it is possible to obtain a leach liquor or solution that contains more than 99.5 wt % of the gold, platinum and palladium originally present in the concentrate together with at least 97 wt % of the other platinum group metals present in the concentrate. Such a solution is paticularly suitable for use in a process in which the precious metal values are sequentially recovered by solvent extraction.

During the first leaching step, most of the gold, platinum and palladium is dissolved. The solid residue will contain what is, for all practical purposes, all the silver, and most of the rhodium, iridium, ruthenium and osmium, together with residual gold, palladium and platinum. It is believed that the treatment of the solid residue with an alkaline oxidising agent to solubilise the ruthenium by converting it to a ruthenate which is then dissolved out of the oxidised residue affects the structure of the residue so that when it is releached the remaining gold, platinum and palladium can dissolve. It is also found that the other precious metals rhodium and iridium, are rendered susceptible to releaching by the oxidising treatment: the reasons for this are not fully understood but it is believed that higher oxides of these metals may be formed during the oxidization and may then react with the acid during releaching to form a soluble product. There may also be some surface activation effects. As regards osmium, this metal almost always reacts in the same way as ruthenium and for this reason references in this specification to the reactions of ruthenium should be taken to include osmium unless otherwise specified. In any event, the concentrates generally do not contain significant amounts of osmium.

The process will now be described in more detail.

The leaching steps are preferably carried out under similar conditions. The acid used is suitably a mixture of equal volumes of concentrated hydrchloric acid and water and the reaction temperature should be in the range from 60° to 105° C., and more preferably around 95° C. Chlorine gas is bubbled through the slurry of concentrate and acid and should be supplied on demand. The reaction generally requires 5 to 10 hours for completion depending upon such factors as the nature of the concentrate and the reaction temperature.

The solid residue from the first leach is separated from the leach liquor, dried and mixed with an excess of an alkaline oxidising agent. Suitable oxidising agents include metal peroxides such as sodium peroxide and barium peroxide and a mixture of potassium hydroxide with potassium nitrate. Of these, sodium peroxide is preferred since it is less expensive than barium peroxide and more effective than $KOH/KNO_3$. As it is impossible to tell what the stoichiometry of the oxidising reaction is (it varies from concentrate to concentrate) a large stoichiometric excess of oxidising agent must be used. When this is calculated on a weight for weight basis, the weight of oxidising agent used should be about twice that of the dry residue (in stoichiometric terms, this approximates to at least a 10-fold excess). The mixture of solid residue and oxidising agent is then heated. The temperature used depends upon the oxidising agent but is generally in the range 550° to 650° C. The reaction time is generally from 1 to 2 hours. When sodium peroxide is used as the oxidising agent, the oxidising reaction is referred to as a "peroxide fusion" although the reactants do not always melt.

The solids from the oxidising reaction are then slurried with water to dissolve out the solubilised ruthenium. The entire slurry may then be combined with the liquor from the leaching step. However, the slurry produced from the oxidised solids will be strongly alkaline and the releaching is to be performed with acid. This will result in a very dilute final solution which will probably need to be upgraded before it can be treated further, particularly if the concentrate is not of high grade. For this reason it is sometimes preferred not to combine the entire slurry with the leach liquor but to reduce the ruthenium and reprecipitate it, thereby combining it with the slurry solids. The solids in the slurry may then be filtered off from the alkaline liquor which does not contain any other precious metal values, washed and added to the leach liquor. Suitable reducing agents include formic acid, methanol and hydrazine. Of these, formic acid is preferred because it is environmentally preferable to hydrazine and will reduce both ruthenium and osmium. Preferably the slurry is boiled before the solids are filtered off as this improves the filtration characteristics and helps complete the reduction.

The method used for the recovery of silver will depend to a great extent on the amount of silver in the concentrate. If the silver concentration is low i.e. 10 wt. % or less, the amount of insoluble material remaining after the first leach will be reasonably small. However, if the silver concentration rises much above 10 wt. %, the amount of insoluble material becomes so large that vast amounts of oxidising agent would have to be used to ensure full solubilisation of the ruthenium. In addition, substantially complete fusion may occur during oxidation and lead to difficulties in slurrying the reaction mixture with water. Accordingly, if the silver content of the concentrate is above 10 wt. % it is preferred to remove the silver before the oxidising step. This may be done in two ways: either the silver may be removed from the concentrate before the first leaching step, or it may be removed from the residue of the first leaching step before oxidation thereof.

The silver may be removed before the leaching step by a preliminary leach with nitric acid. This leach may be carried out at 90° to 95° C. using a 25 to 30% aqueous solution of nitric acid until fuming ceases. This will dissolve 50 to 60 wt. % of the silver together with about 20 wt. % of the palladium and some of the base metals present. The silver may be removed from solution as silver chloride and the base metals may also be removed by precipitation. The palladium may be recovered by reduction and is preferably recombined with the insoluble residue from the preliminary leach before the latter is leached with hydrochloric acid and chlorine. Although the silver is not all removed in such a pre-treatment, the bulk of the insoluble residue from the $HCl/Cl_2$ leach will be reduced.

Alternatively, or additionally if desired, silver may be removed from the insoluble residue of the first $HCl/Cl_2$ leach by treating that residue with aqueous sodium hydroxide and then with nitric acid to form a solution of silver nitrate from which the silver may be recovered by conventional means.

If the silver content of the concentrate is low, the silver may be allowed to go right through the process in the insoluble phase at all times, ending up as silver chloride in the final leach insolubles. Silver is generally recovered from the silver chloride by conventional smelting processes although, if there is very little solid residue from the releaching, it may be recycled to the beginning of the process and mixed with incoming concentrate, as it will not substantially increase the bulk thereof.

The invention will now be further described with reference to the following example. In the example, all percentages are percentages by weight.

EXAMPLE 25.7 kg of a powdered precious metal concentrate having a composition as shown in the following table were slurried with 100 liters of a 1:1 by volume mixture of concentrated hydrochloric acid and water. Chlorine gas was bubbled through the slurry which was maintained at a temperature in the range from 90° to 101° C. in a stirred vessel. The chlorine gas was bubbled into the vessel on demand and the reaction time was 8 hours (the reaction was judged to have ended when the demand for chlorine stopped). The reaction consumed 16.75 kg of chlorine. The leach liquor was filtered off and the insoluble material was washed and dried. The dry weight of the insoluble material, which was in powder form, was 6.1 kg and the volume of the filtrate and washings was 135 liters. The analysis of this insoluble material and the % dissolution in the first leach are also shown in the Table.

The dried insoluble material was intimately mixed with 12.0 kg of sodium peroxide powder. The mixture was heated in trays in a muffle furnace at a temperature in the range from 600° to 620° C. for 1½ and then cooled in air and slurried in 24 liters of water. The slurry was combined with the filtrate from the first leach and 100 liters of concentrated hydrochloric acid were added. The mixture was maintained at a temperature in the range from 90° to 101° C. in a stirred vessel whilst chlorine gas was bubbled through the liquid. The reaction end point was judged as before. This time, the reaction took 6 hours and consumed 4.35 kg of chlorine. The slurry was allowed to cool and then filtered. The insoluble material was washed and dried. The dry weight of this material was 2.56 kg and the volume of the filtered liquor and washings was 287 liters. The composition of the liquor, the % dissolutions and the analysis of the insoluble material are all shown in the table.

TABLE

| ELEMENT | A CONCENTRATE ANALYSIS % | B FIRST LEACH INSOLUBLE ANALYSIS % | C % DISSOLUTION IN FIRST LEACH | D FINAL LEACH LIQUOR g/l ANALYSIS | E TOTAL % DISSOLUTION | F FINAL LEACH INSOLUBLE % ANALYSIS |
|---|---|---|---|---|---|---|
| Pt | 28.74 | 2.44 | 98.0 | 25.01 | >99.9 | <0.2 |
| Pd | 33.43 | 3.02 | 98.0 | 30.97 | >99.9 | <0.02 |
| Rh | 3.57 | 9.13 | 39.2 | 2.78 | 97.2 | 1.0 |
| Ru | 2.98 | 8.91 | 25.4 | 2.42 | 98.1 | 0.56 |
| Ir | 1.36 | 3.53 | 43.7 | 1.21 | 97.6 | 0.35 |
| Au | 5.55 | 2.10 | 90.6 | 3.97 | >99.9 | <0.02 |
| Os | trace | trace | | trace | | |
| Ag | 7.70 | 30.14 | | 0.07 | | 62.3 |

TABLE-continued

| ELEMENT | A CONCENTRATE ANALYSIS % | B FIRST LEACH INSOLUBLE ANALYSIS % | C % DISSOLUTION IN FIRST LEACH | D FINAL LEACH LIQUOR g/l ANALYSIS | E TOTAL % DISSOLUTION | F FINAL LEACH INSOLUBLE % ANALYSIS |
|---|---|---|---|---|---|---|
| Te | 2.5 | 2.6 | not measured | 2.3 | not measured | |
| Sb | 0.4 | 1.0 | | 0.3 | | |
| Sn | 0.1 | 0.5 | | 0.1 | | |
| Pb | 0.5 | 0.1 | | 0.3 | | |
| Bi | <0.1 | <0.1 | | <0.1 | | |
| Cu | 1.2 | 0.9 | | 0.5 | | not measured |
| Zn | <0.1 | <0.1 | | <0.1 | | |
| Ni | 0.3 | 0.3 | | 0.3 | | |
| Fe | 0.7 | 0.9 | | 0.5 | | |
| As | 2.7 | — | | 0.42 | | |
| $S_iO_2$ | 2.6 | — | | 0.28 | | |

From the table, it can be seen that the process produces a solution containing more than 99% of the gold, platinum and palladium in the concentrate and more than 97% of the other platinum group metals in the concentrate. The effect of the oxidising treatment and releaching on the solubilisation of rhodium, ruthenium and iridium can be seen by comparing columns C and E. As this concentrate was relatively rich in precious metals, the optional ruthenate reduction step was not used.

We claim:

1. A process for leaching a concentrate containing precious metals, comprising the steps of leaching the concentrate with hydrochloric acid and chlorine at a temperature in the range from 60° to 105° C. to dissolve most of the gold, platinum and palladium present leaving a solid residue containing substantially all the other precious metals, separating and recovering silver from the process if the silver content of the concentrate is greater than about 10% (by weight) of the concentrate, separating the residue and treating it with an excess (on a weight for weight basis) of sodium peroxide at a temperature in the range from 550° to 650° C. to solubilise the ruthenium, slurrying the resulting solids in water, combining the precious metal values from the slurry with the liquor from the leaching step, releaching the resulting slurry with hydrochloric acid and chlorine at a temperature in the range from 60° to 105° C. and separating the leach liquor from the remaining solids.

2. A process as claimed in clam 1 wherein the precious metal values from the slurry are combined with the liquor from the leaching step by combining the whole slurry with the liquor.

3. A process as claimed in claim 1 wherein the precious metal values from the slurry are combined with the liquor from the leaching step by reducing the ruthenium in the slurry liquor to ruthenium metal which precipitates with the slurry solids, filtering the slurry and combining the solids thus obtained with the liquor from the leaching step.

4. A process as claimed in claim 3, wherein the ruthenium is reduced using formic acid.

5. A process as claimed in claim 1 which further includes the step of leaching the concentrate with nitric acid to dissolve some of the silver prior to leaching the concentrate with hydrochloric acid and chlorine.

6. A process as claimed in claim 1 which further includes the step of treating the solid residue from the leaching step with aqueous sodium hydroxide and then with nitric acid to remove silver from the residue prior to oxidation thereof.

* * * * *